(12) United States Patent
Sayal et al.

(10) Patent No.: US 8,719,007 B2
(45) Date of Patent: May 6, 2014

(54) DETERMINING OFFER TERMS FROM TEXT

(75) Inventors: Mehmet Oguz Sayal, Foster City, CA (US); Kemal Guler, San Jose, CA (US); Burcu Aydin, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 804 days.

(21) Appl. No.: 12/891,150

(22) Filed: Sep. 27, 2010

(65) Prior Publication Data

US 2012/0078610 A1 Mar. 29, 2012

(51) Int. Cl.
*G06F 17/27* (2006.01)

(52) U.S. Cl.
USPC ............ 704/9; 704/10; 707/706; 707/707; 707/708; 705/26.5; 705/27.2; 715/259

(58) Field of Classification Search
CPC .............. G06F 17/30914; G06F 17/30684; G06F 17/30864; G06F 17/3087; G06F 17/27; G06F 17/2875; G06Q 30/00
USPC ............ 704/1, 9, 10; 707/706–708; 715/259; 705/27.2, 26.5
See application file for complete search history.

(56) References Cited

U.S. PATENT DOCUMENTS

| | | | |
|---|---|---|---|
| 7,149,741 B2 | 12/2006 | Burkey et al. | |
| 7,542,958 B1 | 6/2009 | Warren et al. | |
| 7,577,718 B2 | 8/2009 | Slawson et al. | |
| 7,870,038 B1 * | 1/2011 | Hammond et al. | 705/26.64 |
| 8,473,400 B1 * | 6/2013 | May | 705/37 |
| 8,543,462 B2 * | 9/2013 | Allocca et al. | 705/26.1 |
| 2004/0015391 A1 * | 1/2004 | Dupreez et al. | 705/11 |
| 2004/0148227 A1 * | 7/2004 | Tabuchi et al. | 705/26 |
| 2004/0215467 A1 * | 10/2004 | Coffman et al. | 705/1 |
| 2004/0260767 A1 * | 12/2004 | Kedem et al. | 709/203 |
| 2004/0262381 A1 * | 12/2004 | Mesaros | 235/380 |
| 2006/0080221 A1 * | 4/2006 | Murakami | 705/37 |
| 2007/0061222 A1 * | 3/2007 | Allocca et al. | 705/26 |
| 2007/0124291 A1 | 5/2007 | Hassan et al. | |
| 2007/0136126 A1 * | 6/2007 | Notani et al. | 705/10 |
| 2007/0239530 A1 * | 10/2007 | Datar et al. | 705/14 |
| 2008/0162305 A1 * | 7/2008 | Rousso et al. | 705/27 |
| 2008/0222005 A1 * | 9/2008 | Schickler | 705/26 |
| 2009/0144070 A1 | 6/2009 | Psota et al. | |
| 2010/0049593 A1 * | 2/2010 | Du Preez et al. | 705/10 |
| 2010/0185532 A1 * | 7/2010 | Allocca et al. | 705/27 |
| 2011/0258034 A1 * | 10/2011 | Metzler et al. | 705/14.42 |

OTHER PUBLICATIONS

Kuechler, William L, Business Applications of Unstructured Text, Communications of the ACM, Oct. 2007, vol. 50, No. 10, p. 86-93.

\* cited by examiner

*Primary Examiner* — Lamont Spooner (57) ABSTRACT

Systems, methods, and machine readable and executable instructions are provided for determining offer terms from text. A method for determining offer terms from text can include mapping keywords to a domain of a procurement event, and receiving, to a computing device, an offer text associated with the procurement event. Event-specific entities are identified, by the computing device, in the offer text. The computing device determines the domain of the procurement event from the identified event-specific entities, and using the mapped keywords corresponding to the determined domain, determines offer components from the offer text, extracts offer parameters from the offer text, and constructs the offer structure using the identified event-specific entities, derived offer components, and extracted offer parameters.

20 Claims, 3 Drawing Sheets

DETERMINING OFFER TERMS FROM TEXT

BACKGROUND

An entity, such as a business or an individual, may receive written communication concerning an offer to sell an item from a vendor. The written communication may include one or more messages that contain text. However, the text might not be arranged to conform to any particular (e.g., pre-defined) offer structure or format. An individual message may only describe a portion of the offer, and/or may or may not, explicitly refer to other prior, messages, documents, or conduct. The written communication may include a description of the item and/or the economic terms of an offer at which the vendor is willing to sell the item. The written communication may be electronically or physically communicated. For all these reasons, among others, it can be difficult to automatically ascertain, record, and/or compare terms of an offer using a computing device. One previous approach includes merely saving the entirety of written communications concerning the offer terms for future review and analysis by a person.

DETAILED DESCRIPTION

Embodiments of the present disclosure may include methods, systems, and machine readable and executable instructions and/or logic. An example method for determining offer terms from text can include mapping keywords to a domain of a procurement event, and receiving, to a computing device, an offer text associated with the procurement event. Event-specific entities are identified, by the computing device, in the offer text. The computing device determines the domain of the procurement event from the identified event-specific entities, and using the mapped keywords corresponding to the determined domain, determines offer components from the offer text, extracts offer parameters from the offer text, and constructs the offer structure using the identified event-specific entities, derived offer components, and extracted offer parameters.

The main problem addressed by the present disclosure is the automated determination of offer terms, such as discount offers, from various types of communication media containing semi- and/or unstructured text format, and converting those offer terms into a structured format (e.g., pre-defined, standardized). The structured format can then be used for storing the offer terms, for example, inside a database or another convenient file type so that the offer terms can be easily obtained and processed by various software applications.

During procurement events, such as in response to an RFQ (Request for Quote), the terms of an offer from a particular supplier may be communicated using one or more messages (e.g., letters, e-mails, faxes, voice, etc.), which may be in free text format. These various communications may only be individually understandable within an understood context within which the messages occur. However, the context may not be explicitly stated within any of the messages, and thus difficult for a machine to ascertain. For example, an RFQ may provide the standard terms of a purchase sought by a buyer. The offer terms sought by the buyer may refer to other documents or transactions or conduct (e.g., same terms as the last sale) defining default offer terms. As used herein, offer terms refer to offer components and offer parameters corresponding to respective components. An RFQ may be submitted to several suppliers in order to provoke competitive offers for sale. It may be desirable for a buyer (or seller) to be able to compare offer terms. In order to facilitate processing by decision support, data analysis, and reporting systems, among others, converting the terms of an offer (e.g., from various multiple vendors) into a common structured format can therefore be beneficial.

According to various embodiments, determining offer terms from offer text according to a structured offer format can be accomplished by initially identifying event-specific entities (e.g., nouns) in the offer text using domain-specific definitions, dictionary, and/or ontology. As used herein, "offer text" can include, in the aggregate, any text associated with a particular offer and/or text referred to in communications concerning a present offer. Thus, the offer text can include messages and documents from a seller, messages and documents from a buyer, and/or other applicable documents (e.g., third party documents). Messages can include e-mail and/or verbal communications that have been transcribed and memorialized into written form such as by a voice recognition process, for example. Documents can include electronic representations of physical print media or electronically-stored text.

Event-specific entities may be particular vendors, types of equipment (e.g., drives), and/or individual item identities (e.g. part numbers), among others. The domain may be a particular technology or topic, such as a particular RFQ or other procurement event. According to embodiments of the present disclosure, a domain can provide context to a dictionary or ontology used in ascertaining the meaning of offer text. For example, the text "spam" may have a very different meaning with respect to the domain of electronic communications versus its meaning with respect to the domain of restaurant operations. A domain may be explicitly provided (e.g., communications labeled as being associated with a particular procurement event or indicated via metadata upon storage thereof) or ascertained by analysis of portions of the offer text.

As domain and event-specific entities are ascertained, components of a particular offer structure can be determined in the offer text. As further discussed below, offers can be structured in a number of different ways. However, different offer structures can each have certain associated components (e.g., base price and discount therefrom). Once the structure of the offer is determined from the offer text, parameters (e.g., values) corresponding to the components of the determined offer structure can be identified in the offer text and extracted therefrom for storage in a more structured format.

Offer terms may be presented having various structures and/or at varying levels of explicitness. While a human may understand a context for a particular offer based on their cumulative education, experience, and/or one or more prior communications that can serve to define terms of an offer in some way (e.g., place the most-recent communications in a context), a computing device receiving offer text may not be able to "connect the dots" in the same manner to derive offer terms from semi- or unstructured offer text. According to the present disclosure, semi- or unstructured offer text can be converted into a well-defined offer structure by incorporating event level knowledge, domain information, and text (e.g., word, phrase) meaning from a domain-specific dictionary or ontology. The methods of the present disclosure go beyond the rote (e.g., non-contextual) information extraction, natural language processing, and/or text mining methods of previous approaches.

Once the offer structure is determined and parameters corresponding to the components of the determined offer structure are identified, the offer can then be constructed in a structured format using the identified entities, offer components, and corresponding parameters. The constructed offer can be stored according to a preferred format in a database, or other convenient file format, for future retrieval and/or use.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the designators "N," "M," and "X" particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 116 may reference element "16" in FIG. 1, and a similar element may be referenced as 216 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

An offer to sell, or modify terms of a sale, a product or service may be captured as an offer communicated by multiple communications (e.g., messages) from a supplier. Individual messages may not set forth the entire set of the offer terms. That is, an individual message may provide a portion of the offer terms. Furthermore, individual messages may affirm, reject, and/or modify one or more terms set forth in previous communications, prior agreements, prior dealings, and/or standard industry practices. Additionally, multiple communications taken together may not explicitly set forth all applicable offer terms related to a particular transaction. Frequently, portions of an offer that are not different than a previous offer, standard terms, industry standard practice, or other understood terms are not explicitly addressed in specific offer statements. For example, statutes codifying the Uniform Commercial Code, common law, conduct of the parties and/or verbal communications may be the source for offer terms missing from written communications concerning a particular transaction.

Offer communications are often formatted in semi- or unstructured text (e.g., free text) that make it challenging for a buyer (e.g., a person) to compare offers with one another. As computing devices are used more and more in communications, processing, inventory, accounting and other aspects of a business entity's purchasing function, it can be beneficial to convert offers communicated in free text into a structured format that can be used for storing the offer details inside a database or other convenient file type so that the offer details may be read, processed, and/or stored by various software applications.

Another difficulty is that offers may be of different types, which make it difficult for the offers to be directly compared to one another. For example, one supplier may arrange an offer structure of a particular type that is used to respond to solicitations from prospective customers. When a prospective customer solicits offers from a number of suppliers, the customer may receive back offers of different types, making direct comparison between offers difficult. Alternatively, a prospective customer may solicit an offer from a particular supplier, and request that the supplier provide an offer of a specific type. However, the supplier may not normally provide offers of this type, and thus has to convert its standard type offer to the type being requested.

One type of offer that is referred to herein is an incremental offer. An incremental offer includes a maximum base price for an item, and one or more price discounts having one or more corresponding volume thresholds. There may be equal numbers of price discounts and volume thresholds. When the party purchases a volume of the item that exceeds a given volume threshold, the maximum base price is decreased for the volume of the item above the threshold by a corresponding price discount, but the maximum base price is not decreased for the volume below the threshold. For example, an incremental offer may be specified by a maximum base price, one or more price discounts, and one or more volume thresholds that correspond to the price discounts.

The price discounts may be positive (as described above) or negative (e.g., additional items are more expensive per unit). In the case where a price discount is negative, it is effectively a surcharge or mark-up. For example, between zero and fifty units, a supplier may charge a base price of five dollars. Above fifty units, a supplier may specify a surcharge or mark-up of one dollar, such that the units sold in excess of fifty units cost six dollars each. In this case, the one-dollar surcharge or mark-up is considered a price discount of negative one dollar.

The same pricing terms provided by a positive discount (e.g., a greater quantity of items cost less per item) could also be alternatively phrased as a particular minimum base price (e.g., associated with each item based on a certain volume of items) and one or more price adders associated with one or more corresponding lower volume thresholds. For example, an offer may provide a minimum price for ordering more than a threshold quantity of items, and provide an additional per unit cost for ordering less than the threshold quantity of items.

Terms other than price changes may also be incrementally adjusted. For example, free shipping, gift wrapping, or other non-price offer terms may change based on quantity or other sale attribute (e.g., color, size, delivery time, type of payment, etc.).

Another type of offer is referred to herein as a cumulative offer. A cumulative offer also includes a base price for an item, and one or more price discounts having one or more corresponding volume thresholds, such that there are equal numbers of price discounts and volume thresholds. When the party purchases a volume of the item that exceeds a given volume threshold, the base price for the entire volume is reduced by a corresponding price discount. That is, the base price for the volumes of the item both below and above the threshold is reduced by the price discount. As such, thresholds are used just to determine the unit price that applies to the whole purchase.

For example, a cumulative offer may also be specified by a base price, one or more price discounts, and one or more volume thresholds that correspond to the price discounts. However, the discounts apply to the whole volume, rather than only the portion of the volume that is above a particular threshold. As with incremental offers, cumulative offers may have price discounts that are positive or negative (e.g., the price discounts are effectively price surcharges), may be described as adders for lower volumes, and/or may involve non-price offer terms.

Embodiments of the present disclosure provide for determining offer terms from text. Further embodiments of the present disclosure provide for storing values quantifying the offer terms according to a pre-defined set of possible offer terms. As such, disparate types of offers and/or offer term communication formats that are received from different suppliers can be stored in a convenient (e.g., standardized) format, compared to one another, and/or further utilized by software operating on one or more computing devices.

Figure 1:
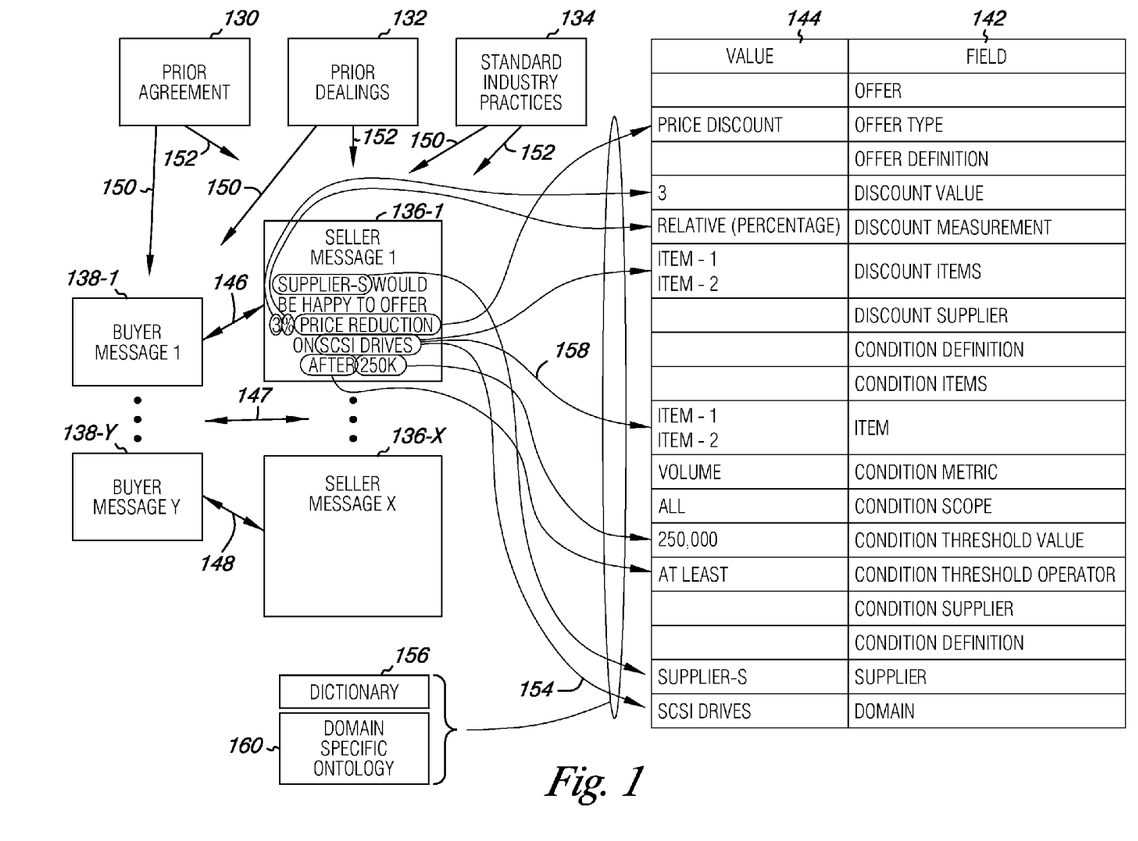
FIG. 1 illustrates an example process of determining offer terms from text according to the present disclosure.

FIG. 1 illustrates an example process of determining offer terms from text according to the present disclosure. An offer structure usually contains and offer statement and one or more conditions. For simplicity, the offer structure for a discount type of offer is used to illustrate the features of the present disclosure. However, embodiments are not limited to any particular offer structure in the offer text, and the methodology discussed below can be applied to other offer types such as markups, price adjustments, etc.

A discount offer structure can contain one or more of the following components: base price, value of discount, discount value measurement type (e.g., absolute, relative), item(s) to which the discount is applicable, seller offering the discount, and exclusions.

FIG. 1 illustrates an example process of determining offer terms from text according to the present disclosure. Shown in FIG. 1 are a number of seller messages, 136-1, . . . , 136-X, and a number of buyer messages, 138-1, . . . , 138-Y. The respective messages, comprising offer text associated with a particular procurement event are sent from or received to a computing device (e.g., the buyer's computing device). The seller messages may have been generated in response to an RFQ, or other (e.g., less-formal) purchase inquiry by the buyer, or may be part of an unsolicited offer for sale initiated by the seller. One or more of the seller messages may explicitly or impliedly be based on one or more previous understandings between the seller and buyer, including but not limited to prior agreements 130, prior dealings 132 (e.g., previous transactions of similar goods), and/or standard industry practices 134, each of which may be memorialized in some form of text-based documentation. For example, default terms set forth in an RFQ soliciting seller bids can be a previous understanding. Therefore, the text of the RFQ may constitute part of the offer text upon which subsequent seller messages modify and/or supplement. Arrows 150 indicate that the prior agreements 130, prior dealings 132, and/or standard industry practices 134 can be incorporated by explicit and/or implicit reference into buyer messages 138-1, . . . , 138-Y and/or provide context thereto. Arrows 152 indicate that the prior agreements 130, prior dealings 132, and/or standard industry practices 134 can be incorporated by explicit and/or implicit reference into seller messages 136-1, . . . , 136-X and/or provide context thereto.

An initial seller message 136-1 (e.g., "seller message 1") associated with a particular procurement event may build upon one or more of the previous understandings, such as the RFQ. The initial seller message 136-1 represents in FIG. 1 an e-mail message that contains the following free text, "Supplier-S would be happy to offer 3% price reduction on SCSI drives after 250K."

The initial seller message 136-1 may trigger a response, such as further inquiry, from buyer, for example, via buyer message 1 138-1. Buyer message 1 may refer to, or modify, or otherwise build upon the initial seller message, as indicated by arrow 146. The buyer message(s) and additional seller message(s) may change and/or supplement the contents of seller message 1, and thus contribute to the offer text. These subsequent messages may refer, directly or indirectly, to previous messages from the other party, as indicated by arrows 147 and 148. The following example will limit the following discussion of offer text analysis to illustrate the present method using only the contents of seller message 1. However, it should be understood that the offer text can include the additional buyer and seller messages, as well as the prior agreements 130, prior dealings 132, and/or standard industry practices 134, and other relevant documents (e.g., verbal conversations recorded and transcribed to text format), among others.

A previous approach utilizing general purpose text extraction or text mining might have a lot of difficulty in understanding the meaning of the offer statement contained in seller message 1 as an offer. Natural language processing approach may not be able to do much without domain specific knowledge. The approach of the present disclosure first includes identification of event-specific entities. According to some embodiments of the present disclosure, the particular event is established from one or more of the entities identified within the offer text, with or without, reference to additional information. For example, an RFQ concerning a particular event may have been directed to Supplier-S. Thus, identification of Supplier-S may be indicative of the particular event.

However, Supplier-S may have been invited to bid on numerous RFQs, only a portion of which concern SCSI drives. Thus, identification of "Supplier-S" may identify a subset of procurement events, and identification of "SCSI drives" in the offer text may further identify a particular one of the subset of procurement events to which seller message 1 pertains.

According to other embodiments of the present disclosure, the event may be explicitly stated in the communications. For example, seller message 1 may explicitly reference a particular procurement event (e.g., in the message subject line) or a code mapped to a particular procurement event. Other methods for associating a particular message to a particular event are also contemplated by the present method. For example, the destination address of seller message 1 may be mapped a particular event. By one of the above-mentioned approaches, or by other analysis, a computing device can determine a domain of a procurement event to which a particular message pertains. Once a domain is determined, the computing device can utilize meanings of keywords that have previously been mapped to the domain in further analyzing the offer text.

In situations where the content or the subject line of a specific message does not allow direct identification of the event to which the message pertains, additional metadata (such as subject line content, timestamps, and/or recipient lists) can be used to construct a hierarchy (e.g., order, tree, etc.) of messages that can be used sequentially to eliminate the ambiguity about the contextual event. For example, a message from Supplier A (e.g., Message 1) with content "$5" does not contain much usable information. Knowing that this particular message is in reply to a previous message (e.g., Message 2) with content "How about Item X?" adds some context to Message 1; however, the contents of the two messages together still leaves substantial ambiguity. If the relative location of these two messages in a hierarchy of message threads can be identified, the fact that these two messages are preceded by Message 3 with content "$3" and Message 4 with content "What is the invoice price of Item Y in your offer?" allows construction of two important pieces of information: 1) Supplier A's invoice price offer for Item Y is $3, and 2) Supplier A's invoice price offer for Item X is $5. The growing corpus of information that is obtained by going up the hierarchy of the messages reduces the number of candidate events to which a particular message may pertain.

As discussed above, identifying, by the computing device, event-specific entities in the offer text can lead to determination of the domain of a procurement event. Or, establishing a particular event to which the present message pertains, either directly or indirectly, may lead to further identification of entities in the offer text. The determination of event-specific entities and/or domain of a procurement event may be an iterative process within one message, or as applied to multiple messages comprising the offer text. Identification of event-specific entities is more useful in understanding the overall offer statement and its meaning, as opposed to using only domain specific dictionary or ontology. A domain specific ontology can help an information extraction approach identify certain keywords, such as "Hard Disk", "SCCI", "Memory", "Flash", etc. However, event specific entities can be much more useful in building a specific offer structure out of a free text statement that is received from a supplier. For example, the keyword "SCSI" actually refers to a specific subset of items (part numbers) that are being purchased in a particular procurement event.

Therefore, the proposed method maps that keyword to a subset of items in the current event rather than simply matching it with other related keywords inside a dictionary or ontology. The mapping of keywords into event specific entities provides deeper insight into their actual meaning within the specific procurement event.

Identifying event-specific entities in the offer text can include mapping identified entities to a particular offer component and/or determining that a noun within the offer text is an entity. In the example illustrated in FIG. 1, the entity "Supplier-S" refers to the supplier that submits the offer. Thus, "Supplier-S" can be mapped to a database having at least a field 142 and value 144 corresponding to the field as shown in FIG. 1.

The entity "SCSI" can identify a domain of the procurement event applicable to the example illustrated in FIG. 1. Thus, "SCSI" can be mapped to the database corresponding to the domain as shown at 154. That is, the first level of context for analysis of the offer text is that related to SCSI drives, thus keywords mapped to the SCSI domain can be used as a first level in determining the meaning of the offer text.

The second level is the particular event (e.g., procurement event). That is, keyword meanings can be further defined according to their meaning with respect to a particular procurement event. The entity "SCSI" can also identify a subset of items (e.g., part numbers) known to be out for procurement that are associated with SCSI interfaces (e.g., those associated with SCSI interfaces). Thus, the particular procurement event can be identified, from which event-specific keyword definitions can be subsequently used.

For example, if one of several pending procurement events (e.g., RFQ) have items related to SCSI interfaces, presence of the word "SCSI" in the offer text can also identify the particular procurement event and the particular items (e.g., item-1 and item-2 set forth in the RFQ but not explicitly mentioned in seller message 1) that use SCSI interfaces. Thus, item-1 and item-2 can be identified indirectly as being an entity to which the offer text (e.g., seller message) concerns and cause the identified items to be mapped to the database as indicated at 158.

Item-1 and Item-2 may, for example, be derived from prior dealings (e.g., and RFQ) in association with the SCSI interfaces determination of domain made from seller message 1. Items that are being purchased are usually available either in the event specific data, or through company-wide item databases as parameters of particular items. FIG. 1 illustrates a particular domain- and/or event-specific dictionary 156 and/or ontology 160 being used to determine meaning of the text portions of seller message 1 and influencing the mapping of keywords and information determined from the keywords to the entries in the database associated with the offer.

Next, the components of the offer structure are identified. This can be much more difficult than identification of entities. The offer structure contains one or more conditions and an offer statement. A discount offer type is used in the example illustrated in FIG. 1; however, embodiments of the present disclosure are not limited to any particular offer type and may be applied to other offer types such as markups, price adjustments, and the like. A discount offer structure can contain the following components: a value of the discount; a measurement type of discount value (e.g., absolute or relative); a set of items (e.g., part numbers) to which the discount applies; a supplier that is offering the discount; and a set of pre-defined alternative discounts that cannot be applied at the same time. Additional parameters of an offer may include terms related to general payment terms. For example, an offer may specify the due dates for invoiced payments. Similarly, a rebate offer may specify explicit dates at which the rebate will be paid. Other offer structures may have different components.

A discount condition structure can include the following components: a set of entities that provide references to items, such as part numbers, that are relevant in the current context; a condition metric (e.g., spend, volume, etc.); a condition scope that explains how the condition should be applied on individual items and/or suppliers (e.g., for each, for all, etc.); a threshold value, a threshold comparison operator (e.g., at least, at most, equals, etc.); and a supplier.

For example with respect to seller message 1 in FIG. 1, "price reduction" indicates that the offer is a discount type of offer. The word "after" is a condition threshold operator. It is necessary to figure out that the word "after" is referring to an "at least" comparison operator based on its relative location in the offer statement. The method of the present disclosure can use a domain specific ontology to interpret such words in the offer statement.

According to the present disclosure, the parameters are subsequently identified. For example with respect to FIG. 1, "3%" is the discount value as a "relative" measurement, and "250K" is a condition value as "absolute" measurement.

Next, the offer structure can be constructed and mapped to the database as shown. The discount value of 3 can be extracted from the offer text. A discount measurement is determined to be "relative" based upon the percentage sign in the offer text associated with the discount value. The set of items to which the discount applies, item-1 and item-2, have been determined, as discussed above, as has the supplier that is offering the discount (e.g., Supplier-S).

In the example illustrated in FIG. 1, the set of items on which the condition applies is item-1 and item-2 (as discussed above). The condition metric is volume, determined from the presence of a quantity. The condition scope is "for all." Although not specified explicitly, relative discounts can be assumed to have this scope since that is the default scope in the procurement events for hard disk drives. The threshold value is 250,000, which must be ascertained from the meaning of the term "250K." The threshold comparison operator is "at least" determined from the term "after" as previously discussed. And the supplier for which the given condition applies is Supplier-S, also as previously discussed. From the information available from the offer text, there is only one condition defined by the above-mention components.

As shown by the arrows mapping portions of offer text from seller message 1 to the value 144 in the database, the extracted offer structure can be stored in one or more database table(s), or in a file type (e.g., spreadsheet, XML file) that is suitable for storing structured data. Thereafter, details of a particular offer stored in such a well-defined format can easily be communicated into other software applications for further processing (e.g., comparison, economic evaluation, purchasing, etc.) The structured data can have some, all, or fewer than those fields shown in FIG. 1 and associated value entries.

Figure 2:
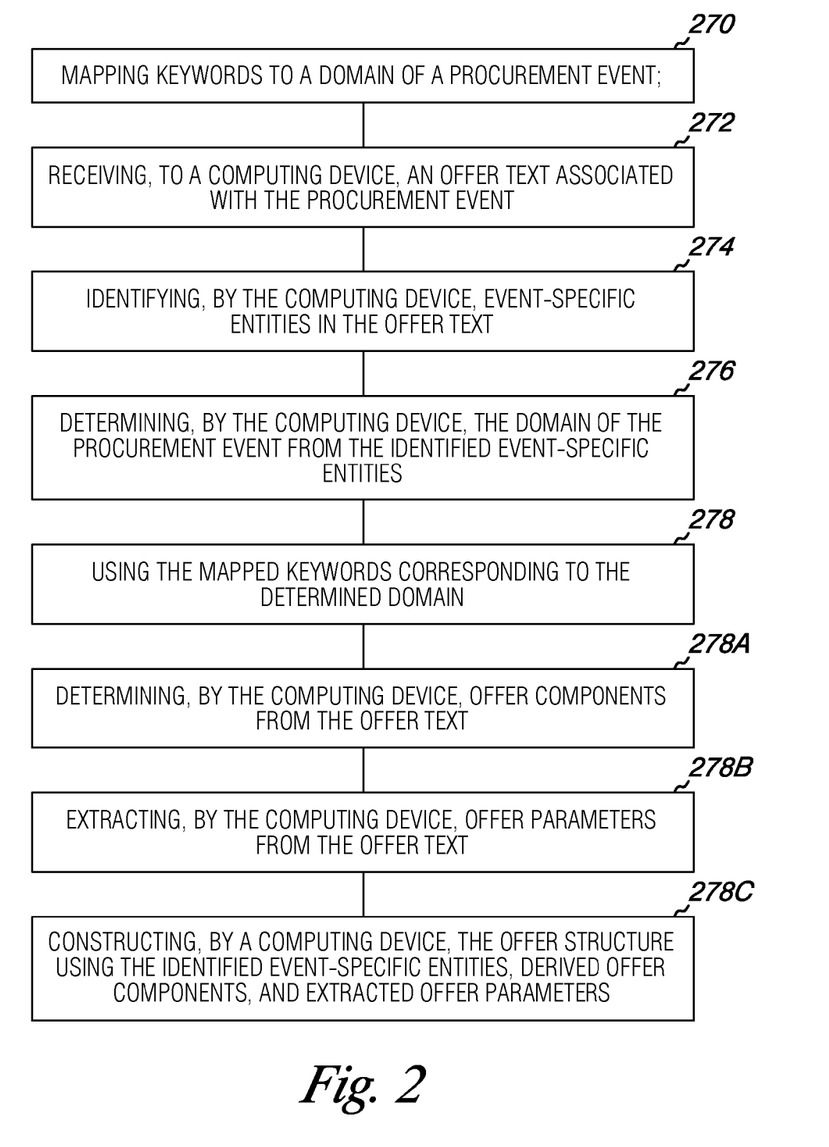
FIG. 2 is a flow chart illustrating an example of a method for determining offer terms from text according to the present disclosure.

FIG. 2 is a flow chart illustrating an example of a method for determining offer terms from text according to an example of the present disclosure. The method includes mapping keywords to a domain of a procurement event 270 and receiving, to a computing device, an offer text associated with the procurement event 272. The method further includes identifying, by the computing device, event-specific entities in the offer text 274, and determining, by the computing device, the domain of the procurement event from the identified event-specific entities 276. The method also includes using the mapped keywords corresponding to the determined domain 278 and determining, by the computing device, offer components from the offer text 278A. Offer parameters are extracted by the computing device from the offer text 278B, and the offer structure is constructed by the computing device using the identified event-specific entities, derived offer components, and extracted offer parameters. Offer parameters can be numerical or textual, and can concern economic, legal, technical, and/or other terms that define an offer and/or the terms of acceptance of an offer, including conditional and prerequisite terms. Offer components and parameters may be a combination of expressly stated, implied, and/or default terms (e.g., defined by statute, regulation, rule, case law, prior dealings, business practices, etc. if not modified by the parties to an agreement). Offer components can include price, quantity, and/or identification of the subject matter to which the price and quantity apply, and offer parameters are the particular "value" corresponding to respective offer component, where "value" can be a number or text. For example, offer components can be the fields 142 shown in FIG. 1 and offer parameters can be the values 144 shown in FIG. 1 corresponding to the respective fields 142.

Figure 3:
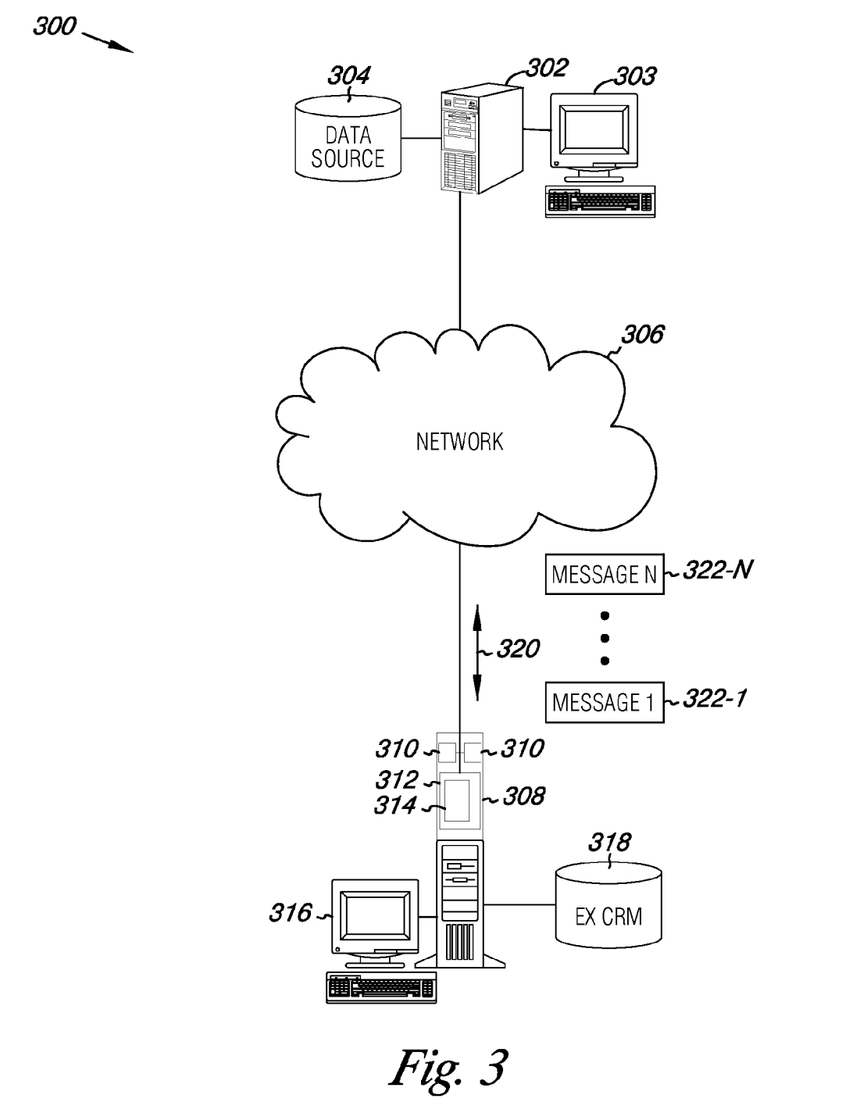
FIG. 3 illustrates a block diagram of an example of a computing system for determining offer terms from text according to the present disclosure.

FIG. 3 illustrates a block diagram of an example of a computing system for determining offer terms from text according to the present disclosure. The computing system 300 shown in FIG. 3 is a networked computing system. The communication network 306 can be a private network such as a local area network or wide area network, or can be a public network, such as the Internet. However, examples of the present disclosure are not limited to a particular computing system configuration.

The computing system 300 can be comprised of a number of computing resources communicatively coupled to the network 306. FIG. 3 shows a first (e.g., a seller's) computing device 302 that may also have an associated data source 304, and one or more input/output devices 303 (e.g., keyboard, electronic display). A second (e.g., a buyer's) computing device 308 is also shown in FIG. 3 being communicatively coupled to the network 306, such that one or more messages 322-1, . . . 322-N, may be communicated through the network between the first and second computing devices.

Computing device 308 may include one or more processors 310 communicatively coupled to a non-transitory computer-readable medium 312. The non-transitory computer-readable medium 312 may be structured to store executable instructions 314 (e.g., one or more programs) that can be executed by the one or more processors 110 and/or data. The second computing device 308 may be further communicatively coupled to a production device 316 (e.g., electronic display, printer, etc.). Second computing device 308 can also be communicatively coupled to an external computer-readable memory 318.

The second computing device 308 can cause an output to the production device 316, for example, as a result of executing instructions of one or more programs stored non-transitory computer-readable medium 312, by the at least one processor 310, to implement a method of determining offer terms from text according to the present disclosure. Causing an output can include, but is not limited to, displaying text and images to an electronic display and/or printing text and images to a tangible medium (e.g., paper). For example, an offer may be determined from text comprising one or more messages from a seller. Terms of the offer may be determined by the second computing device 308, stored in a database such as may be maintained in external computer-readable memory 318, output to production device 316, and/or printed to a tangible medium.

First 302 and second 308 computing devices are communicatively coupled to one another through the network 306. While the computing system is shown in FIG. 3 as having only two computing devices, the computing system can be comprised of additional multiple interconnected computing devices, such as servers and clients. Each computing device can include control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g., 312, 318). The non-transitory computer-readable medium can be integral (e.g., 312), or communicatively coupled (e.g., 318), to the computing device (e.g. 308), in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet). The non-transitory computer-readable medium 330 can have computer-readable instructions stored thereon that are executed by the control circuitry (e.g., processor) to provide a particular functionality.

The non-transitory computer-readable medium, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium can include optical discs, digital video discs (DVD), high definition digital versatile discs (HD DVD), compact discs (CD), laser discs, and magnetic media such as tape drives, floppy discs, and hard drives, solid state media such as flash memory, EEPROM, phase change random access memory (PCRAM), as well as other types of machine-readable media.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Various examples of the system and method for collaborative information services have been described in detail with reference to the drawings, where like reference numerals represent like parts and assemblies throughout the several views. Reference to various examples does not limit the scope of the system and method for displaying advertisements, which is limited just by the scope of the claims attached hereto. Additionally, any examples set forth in this specification are not intended to be limiting and merely set forth some of the many possible examples for the claimed system and method for collaborative information services.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an embodiment," as used herein does not necessarily refer to the same embodiment, although it may.

In the foregoing Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for determining offer terms from text, comprising:
    mapping keywords from a procurement event to a domain of the procurement event;
    receiving, to a computing device, an offer text associated with the procurement event;
    identifying, by the computing device, event-specific entities in the offer text;
    determining, by the computing device, the domain of the procurement event from the identified event-specific entities; and
    using the mapped keywords corresponding to the determined domain:
        determining, by the computing device, offer components from the offer text;
        extracting, by the computing device, offer parameters from the offer text; and
        constructing, by a computing device, an offer structure using the identified event-specific entities, derived offer components, and extracted offer parameters.

2. The method of claim 1, wherein identifying the event-specific entities includes:
    relating communications of the offer text into a hierarchy based on content and metadata of the communications; and
    interpreting the content of the communications in the context of the hierarchy.

3. The method of claim 1, wherein determining the offer components includes selecting a discount type based on economic keywords of the text.

4. The method of claim 3, wherein determining the offer components includes identifying and interpreting relational portions of the text offer using domain-specific references.

5. The method of claim 4, wherein extracting offer parameters includes associating a numerical portion of the text offer with an item quantity or pricing term based on relative positioning of the numerical portion with respect to an economic keyword or item keyword.

6. The method of claim 1, further comprising storing the identified event-specific entities, derived offer components, and extracted offer parameters in a database configured to have offer structure fields and corresponding variable values.

7. The method of claim 1, wherein keyword mapping utilizes domain-specific definitions, dictionary, or ontology.

8. The method of claim 1, wherein the offer parameters comprise a base price, one or more price discounts, and one or more volume thresholds indicating volumes at which the price discounts are to be applied.

9. The method of claim 1, wherein the offer structure is a discount condition structure that includes a condition metric, a condition scope, a threshold value, a threshold comparison operator, a set of entities that provide references to items to which the discount condition structure applies, and a supplier offering the discount.

10. The method of claim 9 wherein the offer text includes at least one document not communicated in the multiple messages that is selected from a group comprising: a standing agreement, prior dealings, and standard industry practices.

11. The method of claim 1, wherein determining the offer components includes deriving from the offer text a condition metric, condition scope, threshold value, a threshold comparison operator, and at least one item to which the condition metric, condition scope, threshold value, and threshold comparison operator apply.

12. A non-transitory computer-readable medium having computer-readable instructions stored thereon that, if executed by one or more processors, cause the one or more processors to:
    map keywords from a procurement event to a domain of the procurement event;
    receive an offer text associated with the procurement event;
    identify event-specific entities in the offer text;

determine the domain of the procurement event from the identified event-specific entities; and using the mapped keywords corresponding to the determined domain:

determine offer components from the offer text;

extract offer parameters from the offer text; and construct an offer structure using the identified event-specific entities, derived offer components, and extracted offer parameters.

13. The non-transitory computer-readable medium of claim 12, wherein constructing the offer structure includes a value of discount, a measurement of discount value, a set of items to which the discount is applicable, a supplier offering the discount, and at least one alternative discount.

14. The non-transitory computer-readable medium of claim 12, further including computer-readable instructions stored thereon that are executed by the one or more processors to derive from the offer text a condition metric, condition scope, threshold value, a threshold comparison operator, and at least one item to which the condition metric, condition scope, threshold value, and threshold comparison operator apply.

15. The non-transitory computer-readable medium of claim 12, wherein the non-transitory computer-readable medium is communicatively coupled to the one or more processors via a communication network.

16. The non-transitory computer-readable medium of claim 12, further including computer-readable instructions stored thereon that are executed by the one or more processors to store an offer parameter in a database as a value associated with a field that corresponds to an offer component.

17. The non-transitory computer-readable medium of claim 12, further including computer-readable instructions stored thereon that are executed by the one or more processors to:

receive the offer text in multiple electronic messages;

relate the multiple electronic messages into a chronological order based on content and metadata of the communications; and interpret the content of a particular electronic message based on the content of at least one electronic message previously occurring in the chronological order to the particular electronic message.

18. A computing system, comprising:

A computing device having at least one processor;

a production device communicatively coupled to the computing device; and a non-transitory computer-readable medium having computer-readable instructions stored thereon that, if executed by the at least one processor, cause the at least one processor to:

map keywords from a procurement event to a domain of the procurement event;

receive an offer text associated with the procurement event;

identify event-specific entities in the offer text;

determine the domain of the procurement event from the identified event-specific entities; and using the mapped keywords corresponding to the determined domain:

determine offer components from the offer text;

extract offer parameters from the offer text; and construct an offer structure using the identified event-specific entities, derived offer components, and extracted offer parameters.

19. The computing system of claim 18, wherein the non-transitory computer-readable medium is communicatively coupled to the at least one processor via the Internet.

20. The computing system of claim 18, wherein the non-transitory computer-readable medium having computer-readable instructions stored thereon that, if executed by the at least one processor, cause an output to the production device that includes the offer components and offer parameters.

* * * * *